Oct. 28, 1958     R. W. CANFIELD     2,857,725

ADJUSTABLE WHEEL MOUNTING APPARATUS FOR MOWERS

Filed May 4, 1955

INVENTOR.
RICHARD W. CANFIELD
BY
Curtis, Morris & Safford
ATTORNEYS

United States Patent Office 2,857,725
Patented Oct. 28, 1958

---

2,857,725

ADJUSTABLE WHEEL MOUNTING APPARATUS FOR MOWERS

Richard W. Canfield, Middletown, N. Y., assignor to Clemson Bros., Inc., Middletown, N. Y.

Application May 4, 1955, Serial No. 506,050

10 Claims. (Cl. 56—25.4)

The present invention relates to adjustable wheel mounting apparatus for lawnmowers and more particularly to such adjustable mounting apparatus which enables a wheel to be quickly and easily adjusted as desired into a plurality of different positions during mowing. The wheel is enabled to be adjusted readily to different heights for regulating the height of cut and in certain instances can be adjusted to different lateral and longitudinal positions.

Among the many advantages of the adjustable wheel mounting apparatus described herein as embodying the present invention are those resulting from the fact that the adjustment is enabled to be made from the top of the lawnmower. There is no need to turn the mower upside down or to reach awkwardly under the mower during adjustment.

Further advantages of the illustrative embodiment of the present invention result from the fact that this apparatus enables a wheel to be quickly and easily removed from the body of the lawnmower and replaced. Moreover, when mowing closely beside obstructions, a wheel can be removed and replaced in a different lateral and longitudinal position on the mower body where it is inside of the lateral limits of the mower body and enables the mower to be run along tightly beside the obstruction.

The adjustable wheel mounting apparatus described herein includes a frame portion on the body of the mower having a plurality of sockets therein and an adjustable tongue included in the axle support and adapted to fit into any one of the sockets. Disengageable locking means secure the adjustable tongue in engagement with these sockets to hold the wheel in place. In order to change the wheel position or elevation the operator merely actuates the disengageable locking means, removes the adjustable tongue and replaces it in another socket at the desired position and re-engages the locking means to hold the tongue in its new position.

It is an object of the present invention to provide improved adjustable wheel mounting apparatus for lawnmowers having to a notable extent the desirable characteristics and capabilities set forth herein and which can be quickly and easily adjusted, and being rugged, light weight, and positive in operation.

In this specification and the accompanying drawings is shown and described a preferred embodiment of the present invention which consists in the features of construction, arrangements of parts and elements as exemplified in this embodiment. However, it is to be understood that this described embodiment is not intended to be exhaustive nor limiting of the scope of the invention, but on the contrary is given for purposes of illustration in order that others skilled in the art may fully understand the invention and the principles thereof and the manner of applying the invention in practical use and modifying and adapting it in various forms, each as may be best suited to the conditions of a particular use.

The various features, aspects and objects of the present invention will be more fully understood from a consideration of this specification in conjunction with the drawings, in which.

Figure 2:
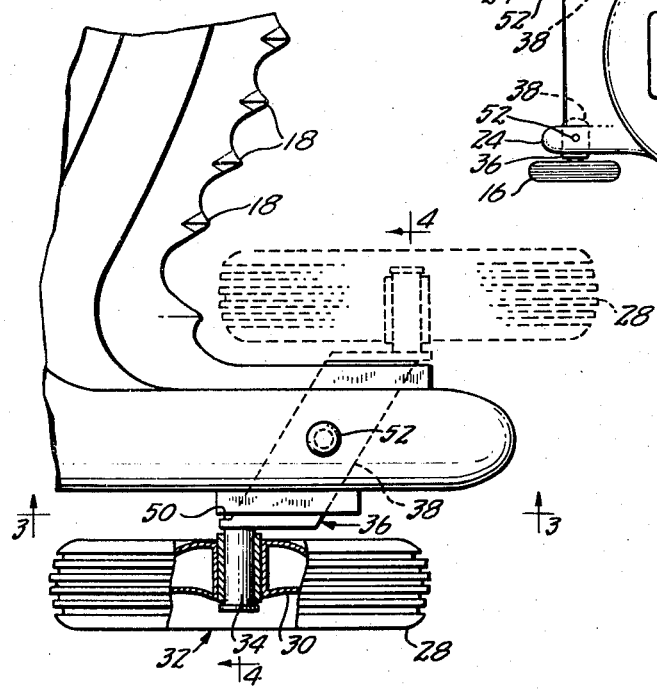
Figure 2 is a top view, on considerably enlarged scale of the right front portion of the mower body including adjustable wheel mounting apparatus embodying the present invention.
Figure 3:
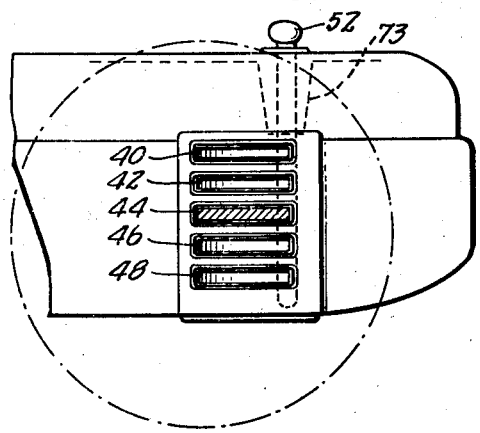
Figure 4:
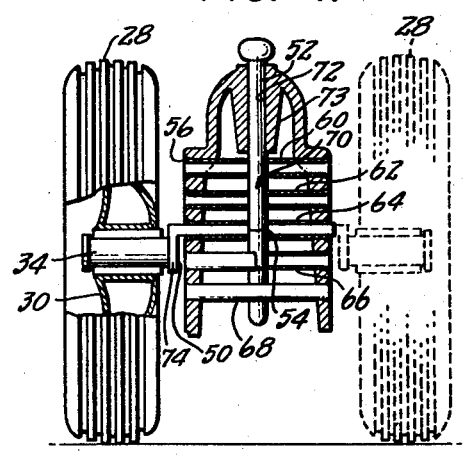

Figure 3 is an elevational view of the mower body portion of Figure 2 taken along the line 3—3 in Figure 2 looking upwardly in Figure 2; and Figure 4 is an elevational sectional view of the apparatus of Figures 2 and 3 taken along the line 4—4 of Figure 3 looking toward the left.

The present invention is described as embodied in a rotary type lawn mower and is particularly well adapted for use in this type of mower. The mower includes a body, generally indicated at 10, with an engine or motor 12 mounted thereon and arranged to revolve a rotor blade beneath the body in an approximately horizontal cutting plane at high speed for mowing grass. The mower body is supported on front and rear wheels 14 and 16, respectively.

In operation the grass to be cut enters the mower through a guard 17 provided by a number of protective teeth 18 arranged in a row across the front of the mower generally between the front wheels, and it is cut off at a height which is regulated by adjusting the height of the rotor blade. To provide clearance for the tips of the rotor blade which revolve closely behind the row of teeth 18, the row is arcuate and projects forwardly at the center. The tips of the rotor blade also revolve closely adjacent the inside of the two sides 20 of the mower body as will be understood, so that the mower cuts a swath substantially equal to the span between these side limits of the body.

Figure 1:
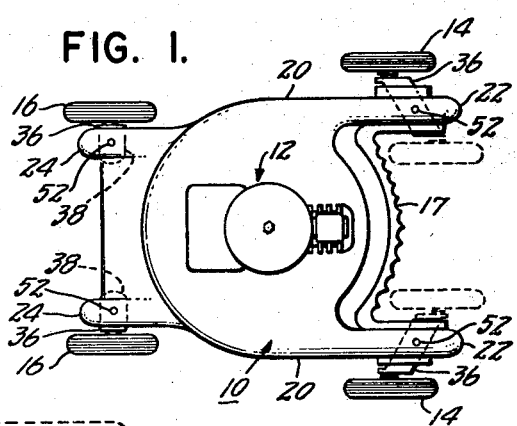
Figure 1 is a top view of a lawn mower embodying the present invention showing in dotted lines various adjusted positions of the front wheels.

As shown in Figures 1 and 2, each of the front wheels is mounted on a frame portion 22 extending forwardly of the lateral body limits 20. Advantageously, to prevent depressing the grass at any point ahead of the full cutting span of the machine between the limits 20, each of the front wheels is normally mounted at a position off to one side of the associated frame portion 22. Preferably, the rear wheels are mounted on rearwardly extending body portions 24, with these wheels tracking within the swath cut by the mower, making it easier to push in tall grass.

Each adjustable wheel assembly (see Figures 2, 3, and 4) includes a ribbed rubber tire 28, a wheel disc 30 and bearing means, generally indicated at 32, including an axle 34 and an adjustable support member 36 carrying the axle. This support member includes an adjustable tongue 38 which fits snugly into any one of a plurality of sockets 40, 42, 44, 46, and 48 in the frame portion 22. A shoulder 50 is included in the support member 36 intermediate the tongue and axle and abuts flushly against the outside surface of the frame portion 22 acting as a stop for locating the wheel as the tongue is slid into any one of these sockets. Disengageable locking means serves to lock the support member in engaged relationship with the desired socket. As shown here, for example, this disengageable locking means includes a movable pin element 52 extending down through the top of the frame portion 22 and coacting with a detent 54 in the tongue 38, which, for example, may conveniently be a hole therethrough. Thus, the locking means is readily accessible without turning the mower over. The operator merely withdraws the pin 52, moves the tongue into a different slot and replaces the pin.

As shown in Figure 4, the frame portion 22 has generally an inverted U-shape as seen in cross section. The sockets extend transversely therethrough and advantageously may be open at each end. These sockets are formed by a plurality of horizontal slots cut in opposite sides of the frame portion and spaced generally one above the other. The slots are at corresponding heights on opposite sides of the frame portion and are generally opposite each other so that the tongue 38 can readily be inserted through corresponding opposed pairs of slots. In many instances it is desirable to define the length of these sockets 40, 42, 44, 46, and 48 by means of steel ferrules 60, 62, 64, 66, and 68, respectively, which serve to line corresponding opposed pairs of holes and extend therebetween. The outer edges of these slots are bevelled outwardly at an angle of about 45° with respect to the axis of the socket as indicated at 56, and the respective ferrule is held in place by flaring out its ends against these bevelled surfaces of the corresponding slots.

Among the advantages of the use of these ferrules is their guiding action as the tongue 38 is inserted. Also, it is usually customary to make the mower frame of softer lightweight metal alloy. These steel ferrules resist wear and can readily be replaced, thus protecting the slots in the machine frame. For aligning the disengageable locking pin 52, a channel 70 extends vertically through the center of each of these ferrules and is aligned with a corresponding hole 72 in a boss 73 in the top of the inverted U-shaped frame portion 22, as seen in Figure 4.

Both the front and rear wheels are adjustable in position, as illustrated in Figure 1, although for purposes of convenience only the adjustment of the front wheels is described in detail herein. The rear wheels are held by adjustable supports 36 which may be identical with those for the front wheels, but as illustrated herein the tongue portions 38 of the adjustable supports 36 for the rear wheels may extend straight into suitable slots in the rear body portions 24 and be held in place by removable pins 52. To adjust the height of the rear wheels, the rear pins 52 are removed and the tongues 38 withdrawn and inserted into higher or lower slots, as desired, in accordance with a similar adjustment in the height of the front wheels. The cross section of the slotted portions of the rear extensions 24 appears very similar to that shown in Figure 4, as will be understood, and enables quick, easy adjustment of the height of the rear wheels.

In rotary mowers it is desirable that the length of the wheel made not be unduly greater than the diameter of the cutting swath, so that the mower can conveniently follow any uneven places in the ground while providing a proper cutting action. Accordingly, the tongue portion 38 projects from the plane of the wheel forwardly at an angle of about 60° when the wheel is in its normal position outside of the lateral limits of the machine. Moreover, the shoulder 50 is provided by a depending bracket portion 74 between the tongue 38 and the axle 34, with the axle projecting from the rear end thereof. Thus, when in its normal position, the wheel is located a considerable distance behind the center line of the socket, resulting in the desired wheel base.

When it is necessary to mow closely along beside an obstruction, such as a foundation wall, the front wheel on the side of the machine near the obstruction is adjusted to an alternate position as indicated in dotted lines in Figure 2. This is done by disengaging the pin 52, removing the tongue 38 and reinserting it in the desired socket from the inside and then replacing the pin.

Another advantage of having the axle offset from the centerline of the tongue is the provision of clearance between the tire and the adjacent portion of the protective guard 17 across the front of the machine. Also, the axis of each socket is at an angle with respect to the body of the mower corresponding to the angle between the tongue and the plane of the wheel. Thus, the insertion of the tongue with the wheel in the inside (dotted) position is facilitated. Moreover, extra clearance is thereby provided so that the tire misses the arcuate forwardly projecting center portion of the guard as the wheel is being slid into place.

In a particular highly successful rotary mower the five sockets in each of the frame portions 22 are spaced ½ inch on centers vertically above one another, providing a cutting height adjustment from 1 to 3 inches inclusive in ½ inch increments. The tongue 38 is 1½ inches wide as measured parallel to the plane of the wheel and is 2⅝ inches long as measured along its axis. The inverted V-shaped frame portion 22 is about 2 inches wide overall.

From the foregoing it will be observed that adjustable wheel mounting apparatus for lawnmowers embodying the present invention are well adapted to attain the ends and objects hereinbefore set forth and to be economically manufactured, since the separate features are well suited to common production methods and are subject to a variety of modifications as may be desirable in adapting the invention to different applications, and the scope of the present invention is intended to include such modifications and adaptations.

What is claimed is:

1. Adjustable wheel mounting apparatus for mowers comprising a frame portion running longitudinally of the mower body and having a generally U-shaped cross section, one side of said frame portion having a first plurality of openings therein spaced generally one above the other, the other side of said frame portion having a second plurality of openings, each opening being generally opposite a corresponding opening in the other side, and a plurality of ferrules extending between corresponding pairs of openings and lining the openings, and a removable pin extending down through the top of said frame portion and intersecting and passing through the center portions of each of said ferrules.

2. Adjustable wheel mounting apparatus as claimed in claim 1 and wherein said frame portion extends forward of the main body of the mower and said ferrules extend therethrough at an angle with their inner ends more forwardly advanced than their outer ends.

3. Adjustable wheel mounting apparatus for rotary mowers including a frame portion on the body of the mower projecting ahead of the cutting area and having a plurality of sockets at various heights therein extending generally horizontally and transversely of the frame portion and opening at each end, and a wheel support including a wheel rotatably mounted thereon and having a substantially horizontal member projecting therefrom and fitting into said sockets from either side, said member having a detent therein, said mower frame portion having a movable detent element therein co-operating with each of said sockets and engaging with the detent in the wheel support member in one of said sockets.

4. Adjustable wheel mounting apparatus for mowers as claimed in claim 3 and wherein said sockets extend at an angle of about 60° from the plane of the wheels and said wheel support member projects away from the plane of the wheel at about 60°.

5. Adjustable wheel mounting apparatus for mowers as claimed in claim 3 and wherein said detent in the wheel support is a hole and said detent element is a pin fitting into said hole to lock the wheel support onto the mower frame.

6. For a lawn mower body having a portion defining a plurality of substantially parallel sockets closely adjacent to one another and at different heights and each having the same effective cross sectional shape, a tongue slidably fitted into one of said sockets, bearing means at the exposed end of said tongue, a wheel rotatably mounted on said bearing means, means in each of said sockets defining transverse openings intersecting the respective sockets, removable locking means slidable along the transverse openings and transversely entering each socket, and detent means on the tongue engaged by said locking means and holding said tongue in said one socket.

7. For a lawn mower body, wheel position adjustment means including a frame projecting horizontally from the body and having a pair of spaced parallel side portions extending parallel with the direction of motion of the mower body, means defining a plurality of sockets extending substantially horizontally between said side portions and opening at both ends through said side portions, said sockets being at different heights, a tongue selectively fitting into any one of said sockets from either end, bearing means on said tongue, a wheel mounted on said bearing means, said frame having an opening in the top extending down between said side portions and intersecting each of said sockets, and a removable pin fitting down into said opening and extending downwardly through each of said openings, said tongue having an opening therein engaged by said pin for locking said tongue in one of said sockets.

8. For a lawn mower having a frame portion defining a plurality of substantially horizontal sockets at various heights therein, means defining a straight channel extending donwardly and crossing each of said sockets, a wheel support, a wheel rotatably mounted on said support, said support having a substantially horizontally projecting member adapted to slide into selective ones of said sockets, a movable locking element in said channel, said wheel support member having an opening therein, said locking element removably engaging said opening in the wheel support member in one of said sockets and removably anchoring said member in said one socket.

9. A lawn mower body including a pair of forwardly projecting frame portions at opposite sides of the front of the body, each frame portion having an inverted U-shape as seen in cross section, the sides of said frame portion being parallel and extending parallel with the direction of motion of the mower body, said side portions having horizontal openings therein spaced one above the other at corresponding heights on opposite sides of each frame portion, the top portion of each frame portion having a channel therein midway between its sides, the axis of said channel extending downwardly between the openings in opposite sides of the frame portion, and a pin having an enlarged head and slidably fitting down into said channel.

10. Adjustable wheel mounting apparatus for rotary mowers including a frame portion on the body of the mower projecting ahead of the cutting area and having a plurality of sockets at various heights therein extending generally horizontally and transversely of the frame portion and opening at each end, and a wheel support axle carried thereby and including a wheel rotatably mounted on said axle, said wheel support axle having a substantially horizontal member projecting therefrom and fitting into said sockets from either side, said member having a detent therein, said mower frame portion having a movable detent element therein co-operating with each of said sockets and engaging with the detent in the wheel support member in one of said sockets, said axle being offset from the center-line of said horizontal member.

References Cited in the file of this patent

UNITED STATES PATENTS

| | | |
|---|---|---|
| 1,873,347 | Smart | Aug. 23, 1932 |
| 1,876,504 | Rossiter et al. | Sept. 6, 1932 |
| 2,165,551 | Iverson | July 11, 1939 |
| 2,308,076 | Hainke | Jan. 12, 1943 |
| 2,485,729 | Gentry | Oct. 25, 1949 |
| 2,564,201 | Hainke | Aug. 14, 1951 |
| 2,709,602 | Orr, Sr. | May 31, 1955 |
| 2,715,033 | Fogarty et al. | Aug. 9, 1955 |
| 2,722,281 | Falkenberg | Nov. 1, 1955 |
| 2,722,432 | Roberton et al. | Nov. 1, 1955 |
| 2,760,589 | Rudman | Aug. 28, 1956 |

FOREIGN PATENTS

| | | |
|---|---|---|
| 454,910 | Canada | Mar. 8, 1949 |